United States Patent
Raimbault et al.

(10) Patent No.: US 8,276,707 B2
(45) Date of Patent: Oct. 2, 2012

(54) ANTI-NOISE DEVICE FOR THE AIR INTAKE CONDUIT OF A SUPERCHARGED INTERNAL COMBUSTION ENGINE

(75) Inventors: Vincent Raimbault, Cosmes (FR); Mickael Cormerais, Vallon-sur-Geé (FR); Arnaud Champion, Laval (FR)

(73) Assignee: Mann + Hummel GmbH, Ludwigsburg (DE)

( * ) Notice: Subject to any disclaimer, the term of this patent is extended or adjusted under 35 U.S.C. 154(b) by 0 days.

(21) Appl. No.: 13/041,633

(22) Filed: Mar. 7, 2011

(65) Prior Publication Data

US 2011/0214936 A1    Sep. 8, 2011

(30) Foreign Application Priority Data

Mar. 5, 2010 (FR) ...................... 10 51619

(51) Int. Cl.
*F02M 35/12*    (2006.01)
(52) U.S. Cl. ...................................... 181/229
(58) Field of Classification Search ................. 181/229, 181/254
See application file for complete search history.

(56) References Cited

U.S. PATENT DOCUMENTS

| | | | |
|---|---|---|---|
| 4,445,336 | A | 5/1984 | Inoue |
| 5,615,554 | A | 4/1997 | Gobert |
| 6,332,442 | B1 | 12/2001 | Komada et al. |
| 2002/0170287 | A1 | 11/2002 | Hirota et al. |

FOREIGN PATENT DOCUMENTS

| | | |
|---|---|---|
| DE | 4331943 A1 | 3/1995 |
| DE | 202006011933 | 12/2007 |
| EP | 0889228 | 1/1999 |
| JP | 60134862 U | 9/1985 |

OTHER PUBLICATIONS

INPI French Patent Office search of priority application 1051619, dated Oct. 26, 2010.

*Primary Examiner* — Jeremy Luks
(74) *Attorney, Agent, or Firm* — James Hasselbeck

(57) ABSTRACT

Anti-noise device for an internal combustion engine (9) equipped with a turbocompressor (10) for supercharging includes a turbine (11) placed in the exhaust gas flow and driven by these gases with the turbocompressor (10) connected by a shaft (13) to a compressor (14) mounted in the air intake conduit (3) of the engine (9). The anti-noise device includes a hinged flap (4) mounted within the air intake conduit (3) of the engine (9), upstream from the compressor (14) and capable of closing this conduit (3) under the action of a gaseous reflux coming towards it.

5 Claims, 2 Drawing Sheets

ANTI-NOISE DEVICE FOR THE AIR INTAKE CONDUIT OF A SUPERCHARGED INTERNAL COMBUSTION ENGINE

CROSS REFERENCE TO RELATED APPLICATIONS

This application claims the benefit under 35 USC 119 of French patent application 1051619 filed in France on Mar. 5, 2010, and which is hereby incorporated by reference in its entirety.

TECHNICAL FIELD

The invention relates to an anti-noise device for an internal combustion engine equipped with a turbocompressor for supercharging intake air which is composed of a turbine placed in the exhaust gas flow leaving this engine so as to be driven by these gases and connected by a shaft to a compressor mounted in the air intake conduit of the engine.

BACKGROUND OF THE INVENTION

Automobile manufacturers are currently concerned about lowering as much as possible the noise nuisances created by the engines of their vehicles.

Many parts can be the source of such nuisances among which the following can be given as examples: air filter boxes, engine cases, cylinder head covers, compressors of turbocompressors for supercharging, etc.

In this context, mounting acoustic devices on various internal combustion engine air circulation tubes, especially on the air intake circuit for such engines, has already been proposed.

It should in particular be noted that in supercharged internal combustion engines the compressor mounted in the air intake conduit can create aerodynamic instability phenomena causing flow rate inversions.

Now, these phenomena are sources of noises extending over a broad frequency band which are particularly bothersome and very difficult to reduce; this is even more difficult because they only appear late in the development cycle.

It is currently proposed to solve this drawback by equipping the air intake conduit of engines equipped with turbocompressors for supercharging with acoustic devices such as broad frequency band silencers or absorbing materials.

As a general rule these acoustic devices are particularly sophisticated and costly and furthermore are often insufficiently effective.

SUMMARY OF THE INVENTION

An objective of the present invention is to remedy these drawbacks by proposing an anti-noise device for an internal combustion engine which is particularly simple and low-cost while also having a satisfactory effectiveness.

According to the invention such an anti-noise device is characterized in that it is made up of a hinged flap mounted in the air intake conduit of the engine, upstream from the compressor and capable of closing this conduit under the action of a gaseous reflux coming towards it.

Such an anti-noise flap, preferably made of a compatible plastic, corresponds to a particularly simple element with a reduced cost.

According to a particularly advantageous aspect of the invention, this anti-noise flap is hinged around an axle which is substantially perpendicular to the direction of airflow in the intake conduit.

The parameters and in particular the mass of the anti-noise flap may be calibrated or adjusted during design such that the force exerted by the normal gas flow moving in the intake conduit leads to the upward rotation of this flap to a predefined opening angle in order for it to open up this conduit for airflow to the engine.

In the absence of such an airflow force, the anti-noise flap rotates in the opposite direction under the action of its weight or a spring or a mass in order to close the intake conduit.

The stop provided on this conduit blocks the anti-noise flap from continuing any rotation beyond the closed position in this inverse direction under the action of the gaseous reflux in the direction opposite the normal direction of air movement.

Thus the intake conduit remains closed which makes it possible to very effectively reduce the nuisance noises induced by surging phenomena from the compressor.

According to another aspect of the invention, the anti-noise flap can advantageously be mounted in a box, case or other housing case integrated into the air intake conduit.

Such a box is preferably closed by a cover with a sealing joint placed between the box and cover such as to form an air-tight seal between the cover and box.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
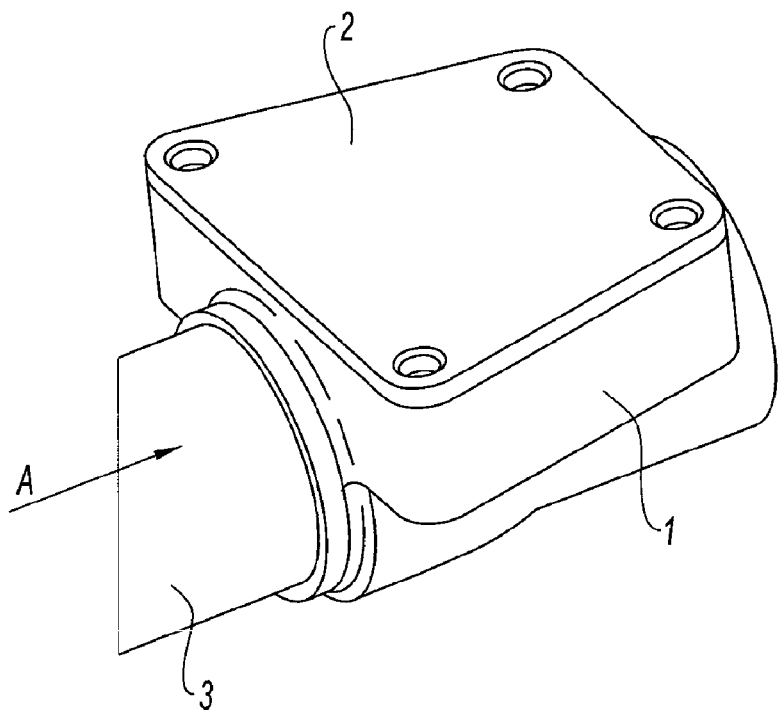
FIG. 1 is a perspective view of an anti-noise device case or box integrated in the air intake conduit of a supercharged internal combustion engine.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to an anti-noise device for a turbocharged internal combustion engine. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 4:
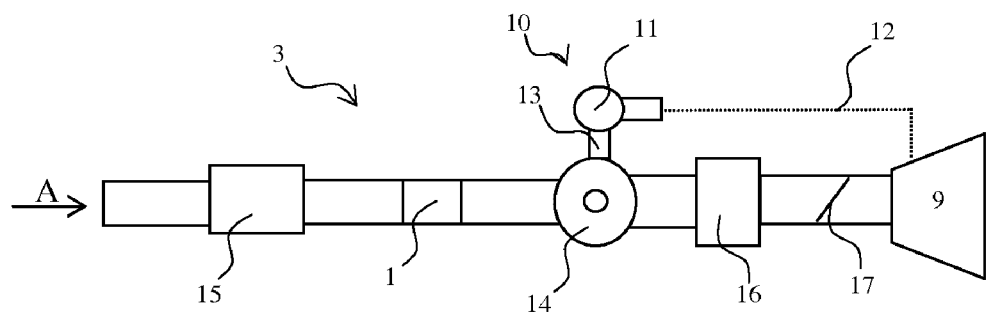
FIG. 4 illustrates schematically the air intake system of a supercharged internal combustion engine equipped with the anti-noise device shown in FIGS. 1 to 3.

First, the arrangement of a case or box 1 of an anti-noise device is described with reference to FIG. 4. An internal combustion engine 9 is equipped with a supercharging turbocompressor 10. The turbocompressor 10 comprises of a turbine 11 placed in the exhaust gas flow leaving the engine 9 by an exhaust gas conduit 12 (shown as a dotted line) so as to be driven by the exhaust gases of the engine 9. The turbine 11 is connected by a shaft 13 to transfer rotary motion to a compressor 14 mounted in the air intake conduit 3 of the engine 9 and operable to compress intake air delivered to the engine 9. The box 1 is mounted upstream from the compressor 14 of the turbocompressor 10 relative to the direction of the intake air movement which is shown schematically by the arrows A. Further, the box 1 is mounted downstream (relative to airflow A) from an air filter 15 integrated in the air intake conduit 3. A charge air cooler 16 is may be mounted downstream from the compressor 14 and upstream from a damper flap 17 (not shown in detail).

Figure 2:
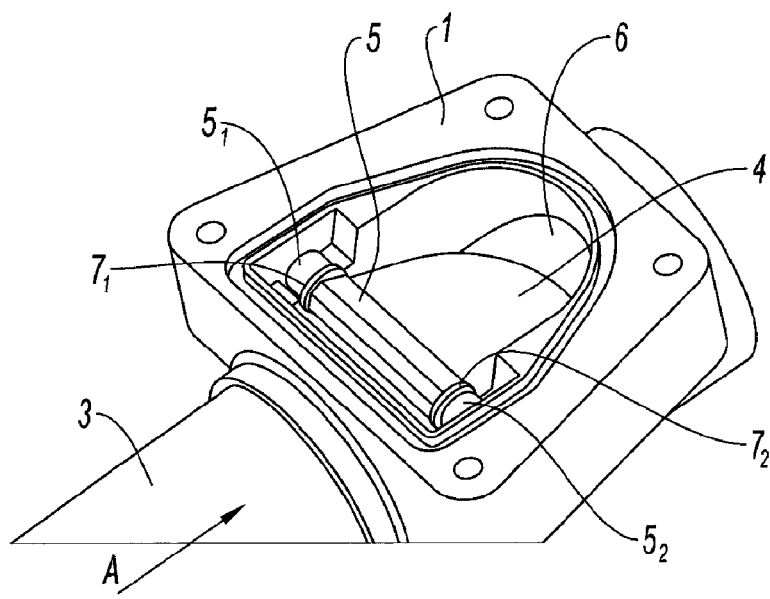
FIG. 2 is a perspective view corresponding to FIG. 1 but in which the cover of the box has been removed.
Figure 3:
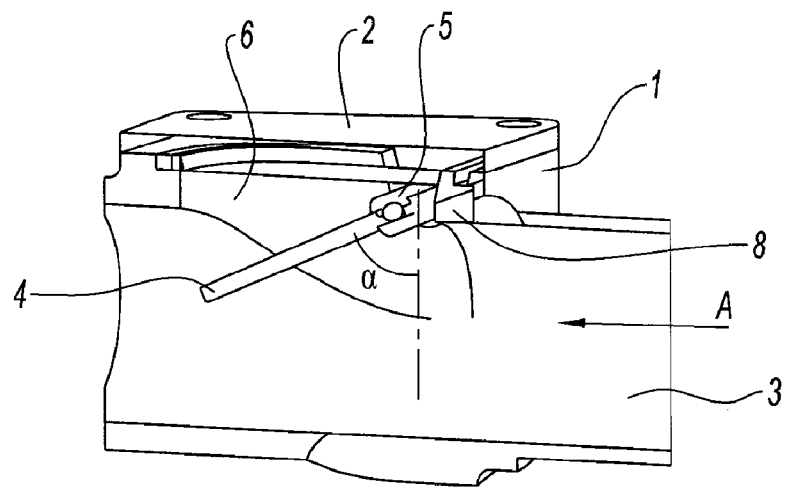
FIG. 3 is a schematic longitudinal section view of the box shown in FIG. 1.

According to FIGS. 1-3 the box 1 is closed over by a cover 2 attached by means of screws (not shown). Alternately the cover can be attached by means of welding, overwelding or other kinds of securing means a would be known to those skilled in the art.

According to FIGS. 2 and 3 the interior of the box 1 (interior chamber) fluidically connects for airflow with the interior airflow passage of the intake conduit 3. The box 1 is illustrated with sidewalls, a bottom wall and an open top which is closed over by the cover 2.

A rotating anti-noise flap 4 molded of compatible plastic is mounted with the intake conduit 3 (intake conduit including the box 1) so as to be able to close the airflow passage of the conduit 3.

As shown in FIG. 2, the anti-noise flap 4 is equipped with a rib 5 arranged on the upper part thereof and on one surface thereof, where this rib 5 extends perpendicularly to the airflow direction A of the intake air in the conduit 3. The rib 5 is extended outwardly on both sides of the flap 4 by two journals $5_1$, $5_2$. For easier production, alternately the flap 4 may be constructed without a rib 5, whereby the journals $5_1$ and $5_2$ are fixed to the sides of the flap 4, as shown in FIG. 2.

These journals $5_1$, $5_2$ are mobile to rotate in the two circular shoulders forming associated bearings $7_1$, $7_2$ located on the side walls of the box 1, at the upper part of this box and on both sides thereof.

The rib 5 and the journals $5_1$, $5_2$ which extend therefrom make up the axle on which the anti-noise flap 4 articulates within the box or case 1 to open or close the airflow passage of the intake conduit 3.

According to FIG. 3, the geometry and in particular the mass of the anti-noise flap 4 are designed and calibrated or adjusted such that the force exerted by the airflow A moving according to the direction of arrow A in the intake conduit 3 drives the upward rotation of this flap about the rib 5 to an open position at a predefined opening angle α against gravity so that it opens the air intake conduit 3 to airflow.

In a manner not shown in the figures, in the absence of such a force the anti-noise flap 4 rotates in the opposite direction under the action of gravity in order to close the conduit 3. The flap 4 may also be provided with a return spring to urge the flap 4 to rotate to the close position in the absence of a sufficient airflow force applied to the flap 4.

According to FIG. 3, a stop 8 formed in the case 1 is operative to block any continuation of this rotation of the anti-noise flap 4 in the closing direction beyond the closed position of the flap (closed position indicated by the short-long dashed vertical line in FIG. 3). This is advantageous to block reverse airflow (airflow in a direction opposite to arrow A) within the air intake conduit 3 such as may occur under the action of the gas reflux occurring in the direction opposite to the normal airflow direction A.

Such gas reflux might be caused by surge phenomena of the turbocompressor. According to the invention the reverse air flow is used to close the conduit 3 by the flap 4 against the stop 8 such that the air passage in the air intake conduit 3 is closed with the result that the radiated noise is reduced.

In summary, an anti-noise device is described, which is constructed to be arranged in an intake air conduit 3 delivering an intake airflow to an internal combustion engine 9 equipped with a turbocompressor 10, wherein the turbocompressor 10 comprises a turbine 11 arranged in an exhaust gas conduit 12 and driven by exhaust gases produced by the engine 9 and delivered to the turbine 11 in the exhaust gas conduit 12. Further, the turbocompressor 10 includes a compressor 14 arranged in the air intake conduit 3 operative to compress the intake airflow. A shaft 13 connects the turbine 11 to the compressor 14 and driveably transferring rotary motion from the turbine 11 to the compressor 14 for compression of the intake air.

The anti-noise device comprises an anti-noise flap 4 rotatably mounted within the air intake conduit 3 at a position upstream from the compressor 14 relative to the airflow, wherein in a closed position, the flap 4 closes off an airflow passage within the intake air conduit 3. The flap 4 is operable under the force of the airflow flowing to the compressor 14 to rotatably open from the closed position, permitting passage of the airflow through the airflow passage of the air intake conduit 3. The hinged flap 4 is operable under action of a gaseous reflux flowing is a direction opposite to the airflow to rotatably move the flap 4 to the closed position to close off the airflow passage of the air intake conduit.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims The invention is defined solely by the appended claims including any amendments made during the pendency of this application and all equivalents of those claims as issued.

The invention claimed is:

1. An anti-noise device arranged in an intake air conduit delivering an intake airflow to an internal combustion engine equipped with a turbocompressor, said anti-noise device comprising:
   a turbine arranged in an exhaust gas conduit and driven by exhaust gases produced by said engine and delivered to said turbine in said exhaust gas conduit;
   a compressor arranged in said air intake conduit operative to compress said intake airflow;
   a shaft connecting said turbine to said compressor and driveably transferring rotary motion from said turbine to said compressor for compression of said intake air; and
   a housing integrated into said intake air conduit at a position upstream from said compressor relative to said airflow, said housing including
      sidewalls, a bottom wall and an open top defining an interior airflow chamber within, said interior chamber in airflow communication with said intake air conduit:
      a cover sealably closing over said interior chamber at said open top;
   an anti-noise flap rotatably mounted within said interior chamber of said housing;
   wherein when in a closed position, said flap closes off airflow thorough said interior chamber and an airflow passage within said intake air conduit;
   wherein said flap is operable under the force of said airflow flowing to said compressor to rotatably open from said closed position, permitting passage of said airflow through said interior chamber and said airflow passage of said air intake conduit; and
   wherein said anti-noise flap is operable under action of a gaseous reflux flowing is a direction opposite to said airflow to rotatably move said flap to said closed position to close off said airflow passage of said air intake conduit,
   wherein said housing box is integrated into said air intake conduit such that airflow in said airflow passage of said air intake conduit passes through said chamber of said housing box.

2. The anti-noise device according to claim 1, wherein
   said anti-noise flap is rotatably hinged around an axle which is arranged in said housing and positioned substantially perpendicular to a direction of normal airflow in said air intake conduit; and
   wherein said axle includes journals, said journals extending axially outwardly on opposing sides of said anti-noise flap;
   wherein said housing sidewalls include circular shoulders forming bearings;
   wherein respective ones of said journals are rotatably received into said circular shoulders;
   wherein said axle rotatable mounts and supports said flap on said circular shoulders within said air intake conduit.

3. The anti-noise device according to claim 2, wherein
   said flap has a mass calibrated to counteract a force applied by said airflow such that airflow generated force acting on said flap drives an upward rotation of said flap to said open position approximating a predefined opening angle α, said opening angle α taken relative to said closed position.

4. The anti-noise device according to claim 3, wherein
   said anti-noise device includes a spring acting upon said flap to urge said flap into said closed position.

5. Air intake system for an internal combustion engine equipped with a turbocompressor for supercharging, wherein said air intake system comprises an anti-noise device according to claim 1.

* * * * *